United States Patent Office 3,037,986
Patented June 5, 1962

3,037,986
2 - (PARA - METHOXYPHENYLCARBINOL) - 1 - (PHENYLALKYL) PIPERIDINIUM HYDRO-BROMIDE
André L. Langis, St. Laurent, Quebec, Canada, assignor to American Home Products Corporation, New York, N.Y., a corporation of Delaware
No Drawing. Filed May 6, 1959, Ser. No. 811,268
3 Claims. (Cl. 260—294.7)

This invention relates to new chemical compounds which are active as peripheral vasodilators, and to the processes by which they may be readily prepared from available starting materials.

More particularly, my new therapeutic compounds are derivatives of pyridine and piperidine, and they may be readily prepared from p-methoxyphenyl-2-pyridylmethanol. The latter compound, which may be regarded as the starting material from which the new compounds possessing peripheral vasodilator activity may be prepared, is itself readily prepared by reaction between 2-pyridinecarboxyaldehyde and a Grignard reagent such as p-methoxyphenyl magnesium bromide, followed by hydrolysis of the intermediate reaction products.

The new chemical compounds, both as bases, and in salt form, are useful in medicine as peripheral vasodilators.

The new chemical compounds with which my invention is more directly concerned include the new pyridinium derivatives 2(p-methoxyphenylcarbinol)-1-(2-phenethyl)pyridinium bromide and 2(p-methoxyphenylcarbinol)-1-(3-phenylpropyl)pyridinium bromide. Also included are their hydrogenated derivatives, similarly useful as peripheral vasodilators, more particularly the piperidine derivatives 2-(p-methoxyphenylcarbinol)-1-(2-phenethyl)piperidine hydrobromide and 2-(p-methoxyphenylcarbinol)-1-(3-phenylpropyl)piperidine hydrobromide.

My new pyridinium derivatives may be represented by the structural formula:

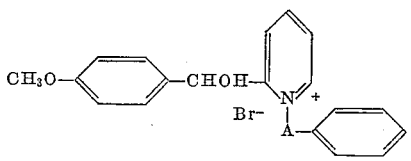

where A is an alkylene group having from 2 to 3 carbon atoms.

My new piperidine derivatives may be represented by the structural formula:

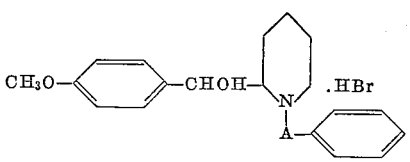

where A similarly represents an alkylene group having from 2 to 3 carbon atoms.

The new piperidine derivatives are thus hydrogenation products of the new pyridinum derivatives wherein the pyridine ring has been fully hydrogenated and the bromide anion of the molecule has been hydrogenated to the corresponding hydrobromide salt.

In preparing my new chemical compounds I utilize as the starting material p-methoxyphenyl-2-pyridylmethanol:

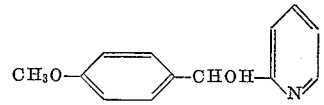

This compound may be readily prepared by reacting 2-pyridinecarboxyaldehyde and a Grignard reagent such as p-methoxyphenyl magnesium bromide.

In preparing the new pyridine and piperidine derivatives, useful because of their peripheral vasodilation properties, p-methoxyphenyl-2-pyridylmethanol may be reacted with an (ω-bromoalkyl)benzene in nitromethane. The ω-bromoalkyl group is one containing from 2 to 3 carbon atoms.

When p-methoxyphenyl-2-pyridylmethanol is reacted with (2-bromoethyl)benzene in nitromethane, for example, one of the novel pyridine derivatives, 2-(p-methoxyphenylcarbinol)-1-(2-phenethyl)pyridinium bromide, is secured. When p-methoxyphenyl-2-pyridylmethanol is reacted with (3-bromopropyl)benzene in nitromethane there results the novel pyridine derivative 2(p-methoxyphenylcarbinol)-1-(3-phenylpropyl)pyridinium bromide.

Hydrogenation of these novel pyridinum derivatives, preferably catalytic hydrogenation with gaseous hydrogen in the presence of a noble metal catalyst, results in my novel piperidine derivatives, the generic structural formula of which has been given above. Thus, the catalytic hydrogenation of 2-(p-methoxyphenylcarbinol)-1-(2-phenethyl)pyridinium bromide results in the new piperidine derivative, 2-(p-methoxyphenylcarbinol)-1-(2-phenethyl)piperidine hydrobromide. Hydrogenation of 2(p - methoxyphenylcarbinol) - 1 - (3 - phenylpropyl) pyridinium bromide under similar conditions results in the new piperidine derivative 2-(p-methoxyphenylcarbinol)-1-(3-phenylpropyl) piperidine hydrobromide.

Starting with p - methoxyphenyl - 3 - pyridylmethanol, which may be readily prepared, as described, from 2-pyridinecarboxyaldehyde and p-methoxyphenyl magnesium bromide, the reactions for the preparation of my new pyridine and piperidine derivatives may be indicated diagrammatically as follows:

I

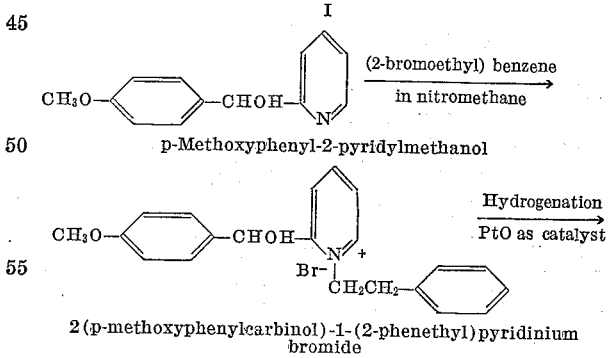

p-Methoxyphenyl-2-pyridylmethanol

2(p-methoxyphenylcarbinol)-1-(2-phenethyl)pyridinium bromide

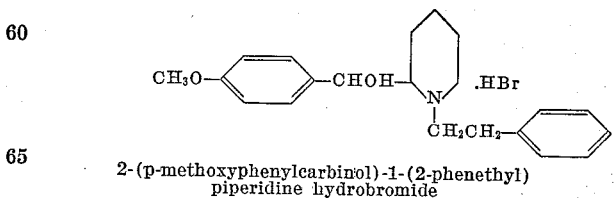

2-(p-methoxyphenylcarbinol)-1-(2-phenethyl) piperidine hydrobromide

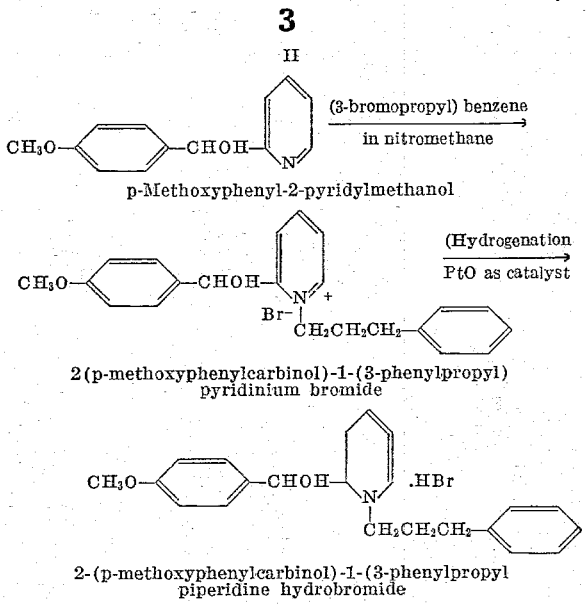

The general nature of these reactions may be summarized as follows:

The compound 2-pyridinecarboxyaldehyde is treated with p-methoxyphenyl magnesium bromide to obtain p-methoxy-phenyl-2-pyridylmethanol in the usual Grignard type reaction. This latter compound is then treated with (2-bromoethyl)benzene in nitromethane and heated to reflux to obtain 2(p-methoxyphenylcarbinol)-1-(2-phenethyl)pyridinium bromide. The latter compound is then hydrogenated with gaseous hydrogen in the presence of platinum oxide as catalyst to yield 2-(p-methoxyphenylcarbinol)-1-(2-phenethyl) piperidine hydrobromide.

The compound p-methoxyphenyl-2-pyridylmethanol may also be treated with (3-bromopropyl)benzene in the presence of nitromethane and heated to reflux to obtain 2)p - methoxyphenylcarbinol) - 1 - (3 - phenylpropyl) pyridinium bromide. This latter compound may then be catalytically hydrogenated with gaseous hydrogen and platinum oxide as the catalyst to prepare 2-(p-methoxyphenylcarbinol) - 1 - (3 - phenylpropyl)piperidine hydrobromide.

Details of these reactions are given in the following illustrative examples. In each case the product produced, as established by analysis, was that referred to in the heading of the particular example in question.

EXAMPLE 1 p-Methoxyphenyl-2-Pyridylmethanol 9.73 grams (0.4 mole) of metallic magnesium and a few crystals of iodine were placed in a 1-litre flask equipped with a condenser, a stirrer and a dropping funnel. The apparatus was dried with hot dry nitrogen. 75.8 grams (0.4 mole) of p-bromoanisole dissolved in 250 ml. of dry ether were then added, dropwise, to the activated magnesium. After two hours the reaction was complete and 20.4 grams (0.2 mole) of 2-pyridinecarboxyaldehyde dissolved in 50 ml. of ether were added, dropwise, to the Grignard reagent.

The mixture was then heated to reflux for one hour, and the reaction product hydrolyzed by pouring it into a solution of aqueous ammonium chloride. The yellow amorphous precipitate was then filtered on a Büchner funnel, dried in an oven, and crystallized from ethanol. The product was then recrystallized from nitromethane. There were thus obtained 26.6 grams of p-methoxyphenyl-2-pyridylmethanol, of melting point 133–134° C. Analysis confirmed the empiric formula.

Calculated for $C_{13}H_{13}NO_2$: C, 72.58; H, 6.08. Found: C, 73.02; H, 6.00.

Five grams of this product were then dissolved in 25 milliliters of ethanol and the solution poured into cold ethereal hydrogen chloride. The gummy precipitate so obtained was crystallized from a mixture of ethanol and ether. There was thus secured 4.0 grams of p-methoxyphenyl-2-pyridylmethanol hydrochloride, melting at 154–155° C.

Calculated for $C_{13}H_{21}NO_2 \cdot HCl$: N, 5.56; Cl, 14.07. Found: N, 5.26; Cl, 14.33.

EXAMPLE 2

2(p-Methoxyphenylcarbinol)-1-(2-Phenethyl) Pyridinium Bromide 15.0 grams (0.069 mole) of p-methoxyphenyl-2-pyridylmethanol and 13.0 grams (0.069 mole) of (2-bromoethyl)benzene were dissolved in 50 ml. of nitromethane. The mixture was heated to reflux for 36 hours, and then poured over a mixture of ice and water. A brown amorphous precipitate was obtained. This product was then dissolved in, and crystallized from, a mixture of acetone and ether. The product, 2(p-methoxyphenylcarbinol)-1-(2-phenethyl)pyridinum bromide, was then recrystallized from an acetone:ethanol mixture. There were thus obtained 8.7 grams of product, melting at 193–194° C. Analysis confirmed the empiric formula.

Calculated for $C_{21}H_{22}NO_2Br$: N, 3.50; Br, 20.0. Found: N, 3.38; Br, 20.25.

EXAMPLE 3

2(p-Methoxyphenylcarbinol)-1-(2-Phenethyl) Piperidine Hydrobromide 5.0 grams of 2(p-methoxyphenylcarbinol)-1-(2-phenethyl) pyridinium bromide, as secured above, were dissolved in 200 ml. of absolute ethanol. 0.3 gram of platinum oxide was added, as catalyst, to the mixture, which was then hydrogenated with hydrogen gas at 50 p.s.i. and room temperature for a period of two and one-half hours. The catalyst was then filtered off and the solvent evaporated under reduced pressure. The crystalline residue resulting was then recrystallized from an ethanol:isopropanol mixture. There was thus secured 3.0 grams of 2(p-methoxyphenylcarbinol)-1-(2 - phenethyl) piperidine hydrobromide melting at 227–228° C.

Calculated for $C_{21}H_{27}NO_2 \cdot HBr$: C, 62.06; H, 6.94. Found: C, 61.98; H, 6.72.

EXAMPLE 4

2(p-Methoxyphenylcarbinol)-1-(3-Phenylpropyl) Pyridinium Bromide 10.8 grams of p-methoxyphenyl-2-pyridylmethanol and 10.9 grams of (3-bromopropyl)benzene were dissolved in 50 ml. of nitromethane. The mixture was heated to reflux for 36 hours and then poured over a mixture of ice and water. A brown amorphous precipitate was obtained. Upon dissolving in an acetone:ether mixture and crystallizing therefrom there were obtained 13.0 grams of 2(p - methoxyphenylcarbinol) - 1 - (3 - phenylpropyl) pyridinium bromide, melting at 152–153° C. Analysis confirmed the emipiric formula.

Calculated for $C_{22}H_{24}NO_2Br$: C, 63.76; H, 5.83; Br, 19.28. Found: C, 64.0; H, 5.82; Br, 19.40.

EXAMPLE 5

2(p-Methoxyphenylcarbinol)-1-(3-Phenylpropyl) Piperidine Hydrobromide 4.15 grams of 2(p-methoxyphenylcarbinol)-1-(3-phenylpropyl)pyridinium bromide were dissolved in 200 ml. of absolute ethanol. There was then added to the solution 0.3 gram of platinum oxide as catalyst, and the mixture hydrogenated with hydrogen gas at 55 p.s.i. at room temperature for three hours. The catalyst was filtered off and the solvent evaporated under reduced pressure. A thick gum was obtained, which was then dissolved in, and crystallized from, an acetone:ether mixture. The product was then recrystallized from an isopropanol:ether mixture to yield 2.0 grams of 2(p-methoxyphenylcarbinol)-1-(3-phenylpropyl)-piperidine hydrobromide, melting at 171–173° C. Analysis confirmed the empiric formula.

Calculated for $C_{22}H_{29}NO_2 \cdot HBr$: C, 62.85; H, 7.29.
Found: C, 63.04; H, 7.54.

I claim:
1. A compound of the structure

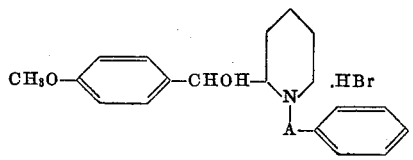

where A represents an alkylene radical containing two to three carbon atoms inclusive.

2. 2-(p-methoxyphenylcarbinol)-1-(2-phenethyl) piperidine hydrobromide.

3. 2 - (p-methoxyphenylcarbinol)-1-(3-phenylpropyl) piperidine hydrobromide.

References Cited in the file of this patent
UNITED STATES PATENTS

| | | |
|---|---|---|
| 2,477,850 | Alles et al. | Aug. 2, 1949 |
| 2,499,214 | De Benneville et al. | Feb. 28, 1950 |
| 2,794,807 | Krapcho | June 4, 1957 |
| 2,886,570 | Palopoli et al. | May 12, 1959 |